(12) United States Patent
Piccolo

(10) Patent No.: US 6,439,536 B1
(45) Date of Patent: Aug. 27, 2002

(54) MOLD FORM AND USE THEREOF

(75) Inventor: Paolo Piccolo, Vigevano (IT)

(73) Assignee: Gatti & Piccolo S.R.L., Vigevano (IT)

( * ) Notice: Subject to any disclaimer, the term of this patent is extended or adjusted under 35 U.S.C. 154(b) by 0 days.

(21) Appl. No.: 09/499,766

(22) Filed: Feb. 8, 2000

(30) Foreign Application Priority Data

Feb. 8, 1999 (IT) .......................................... MI99A0240
Apr. 2, 1999 (IT) .......................................... MI99A0700

(51) Int. Cl.⁷ .............................................. B29C 33/76
(52) U.S. Cl. ........................... 249/63; 249/177; 425/577
(58) Field of Search ............................. 425/129.2, 457, 425/577; 249/63, 175, 177

(56) References Cited

U.S. PATENT DOCUMENTS

| | | | | |
|---|---|---|---|---|
| 3,193,883 A | * | 7/1965 | Thibodaux, Jr. et al. | 249/177 |
| 3,380,123 A | * | 4/1968 | Schmidt | 425/129.2 |
| 3,660,002 A | * | 5/1972 | Morroni | 249/63 |
| 3,832,437 A | * | 8/1974 | Taylor | 249/63 |
| 4,101,626 A | * | 7/1978 | Takahashi et al. | 249/177 |
| 4,134,955 A | * | 1/1979 | Hanrahan, Jr. et al. | 425/129.2 |
| 4,209,160 A | * | 6/1980 | Vanotti | 249/63 |
| 4,295,628 A | * | 10/1981 | Kupf et al. | 249/80 |
| 4,338,070 A | * | 7/1982 | Nava | 425/457 |
| 4,452,420 A | * | 6/1984 | Lundquist | 249/175 |
| 5,352,105 A | * | 10/1994 | Yang | 425/129.2 |
| 6,168,741 B1 | * | 1/2001 | Foldes | 425/577 |

FOREIGN PATENT DOCUMENTS

| | | | |
|---|---|---|---|
| EP | 0 002 311 | * 6/1979 | |
| JP | 4-312 809 | * 11/1992 | 425/577 |

* cited by examiner

Primary Examiner—Allan R. Kuhns
(74) Attorney, Agent, or Firm—Horst M. Kasper

(57) ABSTRACT

A mould (10) for the injection moulding of hollow products (1) or products with recesses and made from a plastic which quickly expands after removal from the mould, has two mould parts (12, 14) and a one-piece core (18) surrounded thereby. The core (18) within the mould rests with an extension (20) against both mould parts (12, 14). This extension (20) is movably supported on a guide column (22, 24) to be removed from the respective mould parts (12, 14) upon opening of the mould. A compression spring (28, 30) is provided in one of the mould parts (12, 14) which is supported against the mould part (12 or 14) and the core (18).

17 Claims, 4 Drawing Sheets

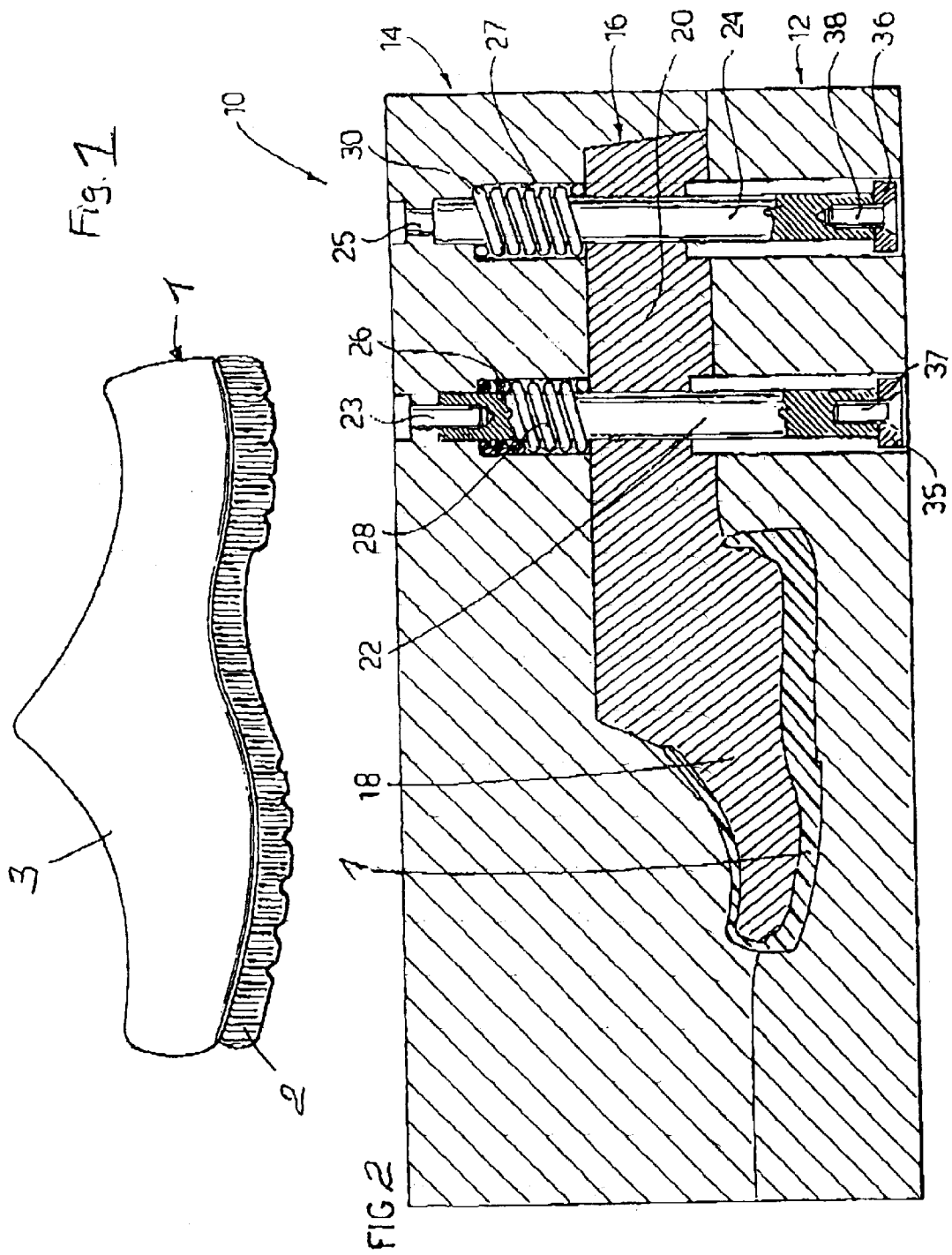

MOLD FORM AND USE THEREOF

FIELD OF THE INVENTION

The invention relates to a mould for the casting of hollow products or products with recesses and made of a plastic which quickly expands after deforming, which mould includes two mould parts and a one piece core surrounded thereby, whereby the mould, parts and the core for injection moulding of the plastic enclose a mould cavity provided with filling channels. The invention further relates to a preferred use of such a mould.

BACKGROUND OF THE INVENTION

A mould of this type is illustrated in FIGS. 6 and 7 of the EP 0 002 311 and briefly described in the reference. This mould serves the production of a bellows including recesses. The mould consists of two mould parts which surround a core. It is described in the reference that the material placed in the mould quickly expands after opening of the mould and thereby releases the core.

Such expanding plastics, especially EVA (ethylene/vinyl acetate copolymer) are used more recently more often for different articles, for example shoe soles. The EVA material is a closed cell foam from which water proof, non-toxic, differently colored products with good technical properties can be made. These products are mostly formed by injection moulding. After the injection moulding and after opening of the mould, the material expands almost immediately by 20 to 80%. It is therefore required that the products are quickly removed from the mould so that an even expansion of the products is guaranteed and so that they cannot deform because of contact with mould parts. This has resulted in the products currently on the market having a simple shape, without hollow spaces and recesses, for example shoe, soles.

One-piece shoes of other plastic, materials such as for example polyurethane, thermoplastics and PVC are also known. Such shoes however do not have the advantageous properties which can be achieved with EVA.

SUMMARY OF THE INVENTION

Purposes of the Invention

It is an object of the invention to provide a mould of the above mentioned general type but further adapted for the manufacture of products with recesses, especially footwear with sole and shaft, wherein the danger of deformation of the products immediately after removal from the mould by expansion of the product is as small as possible and which permits injection moulding in a single injection step.

It is a further object of the invention to provide an advantageous use for the mould of the invention.

The first object is achieved in accordance with the invention in that the core within the mould has an extension and rests with that extension against both mould parts, that the extension is held en a guide column to be movable out of the respective mould part when the mould is opened, and that a compression spring is provided in one of the mould parts which is supported on the mould part and the core for quickly forcing the core out of the mould parts when the mould is opened.

With such a mould it is sufficient for the opening of the mould to lift one mould part off the other. The core and the injection moulded product surrounding it are thereby together quickly removed from the two mould parts by the pressure spring so that an expansion of the moulded part outside the mould is achieved preventing deformations caused by contact with the mould parts. Thus, high-quality, products of EVA including cavities and recesses can be produced with the invention without deformation, for example shoes, bags or portfolios.

The shaft of shoes often requires through-holes to provide for a better aeration of the foot. So far, such shoes with through-holes in the shaft could only he manufactured with complex moulds which include pins of a diameter corresponding to the, one of the de holes. These pins must be inserted into the mould before the injection moulding and again removed before removal of the shoe from the mould. However, that resulted in undesirably high manufacturing costs. These known moulds would be useless for the manufacture of shoes with through-holes when materials are used which are fast foaming and expand after removal. from the mould.

Shoes or other products with lateral through-holes can be manufactured in a simple, fast and cost efficient manner with an advantageous preferred embodiment in accordance with the invention wherein the core has protruding cams which bridge the cavity in the two mould parts.

The removal of the expanded shoe from the mould is especially easily achieved when the maximum radial extent of the cams is no larger than the inner dimension of the expanded product.

The mould is of especially simple construction when the cams are clamped into lateral recesses of the closed mould.

The second object of the invention, namely the finding of an advantageous use for the mould in accordance with the invention, is achieved in accordance with the invention in that the mould is used for the injection moulding of hollow products made of EVA material.

BRIEF DESCRIPTION OF THE DRAWINGS

The invention allows for different embodiments and will now be described in further detail by way of example only and with reference to the attached drawings, wherein FIG. 1 a side elevational view of a shoe produced with a mould in accordance with the invention;

FIG. 2 a vertical cross-section through the preferred embodiment of the mould in accordance with the invention for producing the shoe, shown in the closed position;

DETAILED DESCRIPTION OF THE PREFERRED EMBODIMENT

FIG. 1 shows a shoe 1 as used for example at the beach, which has the shape of a wooden clog and which is made in one piece of a sole 2 and a shaft 3.

Figure 3:
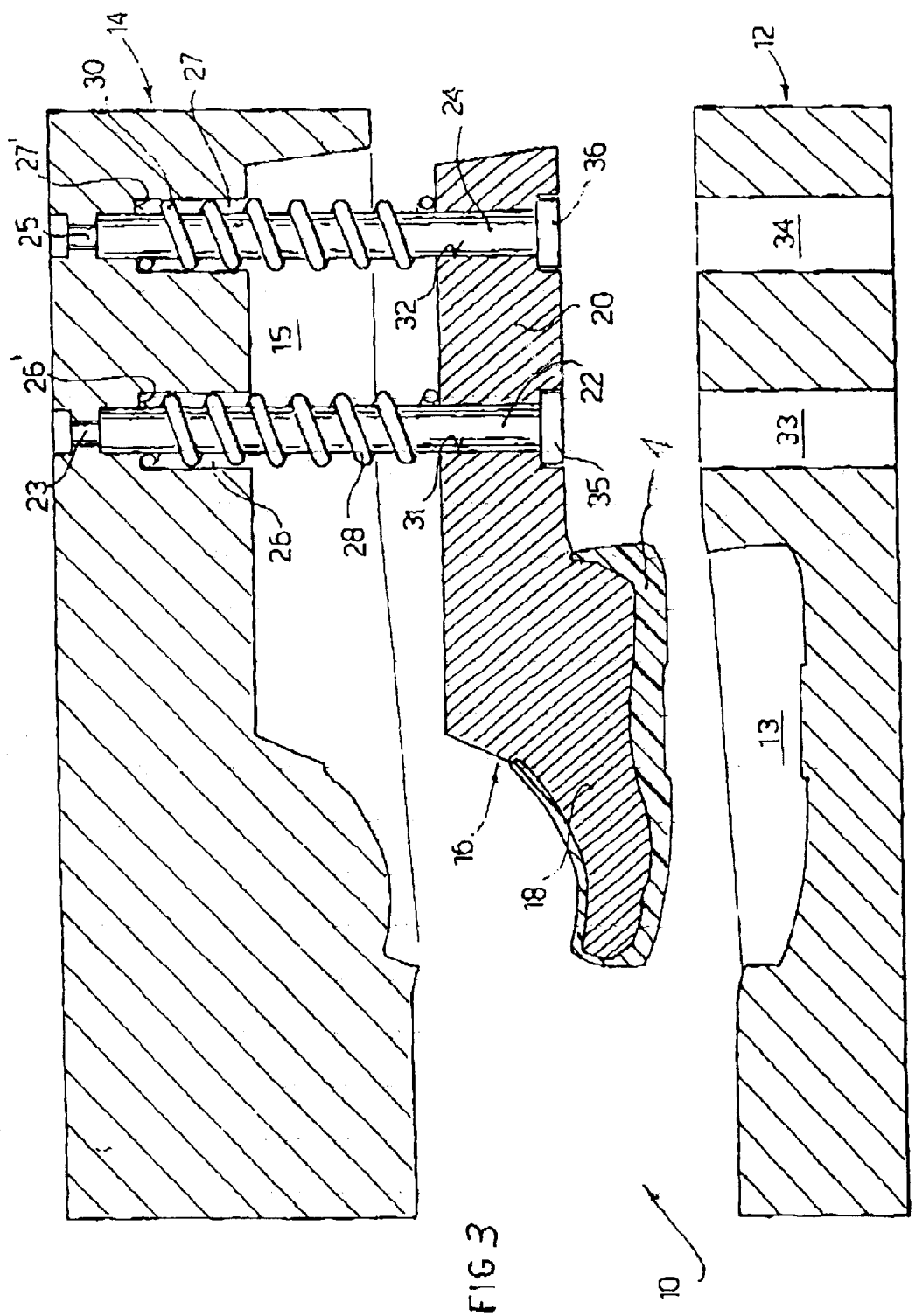
FIG. 3 a vertical cross-section through the mould shown in FIG. 2, but in the opened position.

The mould 10 shown in FIGS. 2 and 3 is used for the production of this shoe. The mould has a lower mould part 12 which can be mounted to a not illustrated lower mould frame of a press. An upper mould part 14 of the mould 10 is then mounted to the upper mould frame of the press. A core element 16 is located between the mould parts 12, 14.

As is apparent from FIG. 3, the lower mould part 12 has a cavity 13 and the upper mould part 14 a cavity 15. The core element 16 has a core 18 which fills the shoe and a rearward extension 20.

Two guide columns 22, 24 are mounted in the upper mould part 14 in a mount 26, 27 of the upper mould part 14 and by way of bolts 23, 25. A compression spring 28, 30 is respectively positioned coaxially to each one of the guide columns 22, 24, which springs are respectively supported at one end on a shoulder 26' or 27' of the mould part 14, and at the other end on the top surface of the extension 20 of the core element 16. The guide columns 22,24 extend through passages 31, 32 in the extension 20 and in the closed condition of the mould 19 respectively engage a bore 33, 34 in the lower mould part 12. There they respectively end in a terminal stop 35, 36 which is affixed to a lower end face of the respective guide column 22, 24 by a screw 37, 38 respectively.

In the closed condition illustrated in FIG. 1, the press forces the upper mould part 14 against the extension 20 and by way of the extension 20 against the lower mould part 12, whereby the compression springs 28, 30 are compressed. The cavity 13 of the lower mould part 12 and partly the upper cavity 15 and the core 18 define a cavity for receiving the plastic for forming the shoe 1 being injected under pressure, which cavity forms the actual mould cavity. The injection channels required for the feeding of the material into the mould 10 are not shown in the drawing, since they are of conventional construction.

After completion of the injection phase, the not illustrated upper mould frame with the upper mould part 14 is quickly lifted off the lower mould part 12. The guide columns 22, 24 thereby simultaneously upwardly lift out of the bores 33, 34. At the same time, the compression springs 28, 30 force the core element 16 downward. The core element 16 is thereby removed from the cavity 15. Upon further lifting of the mould part 14, the terminal stops 35, 36 come to engage from below the extension 20 of the core element 16 and lift the latter out of the cavity 13 of the lower mould part 12. By these interactions, the parts are quickly moved from the position shown in FIG. 1 to the position shown in FIG. 2. The shoe 1 can thereby freely expand and can subsequently be easily removed from the core 18.

Figure 4:
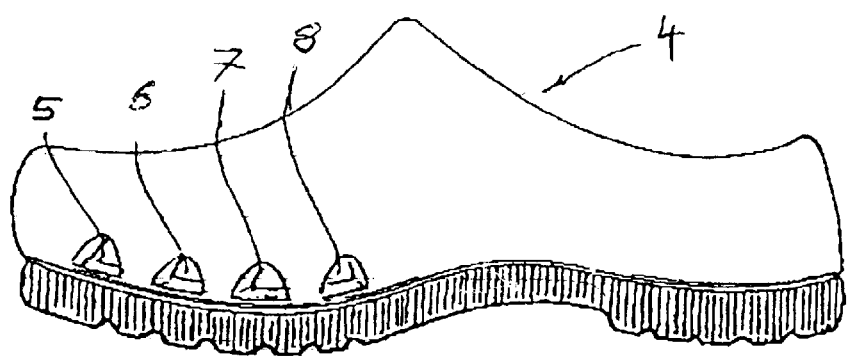
FIG. 4 a side view of a shoe modified from FIG. 1 and produced with the mould in accordance with the invention.

FIG. 4 illustrates a shoe 4, which laterally in the forward region of its shaft has through-holes 5, 6, 7, 8.

Figure 5:
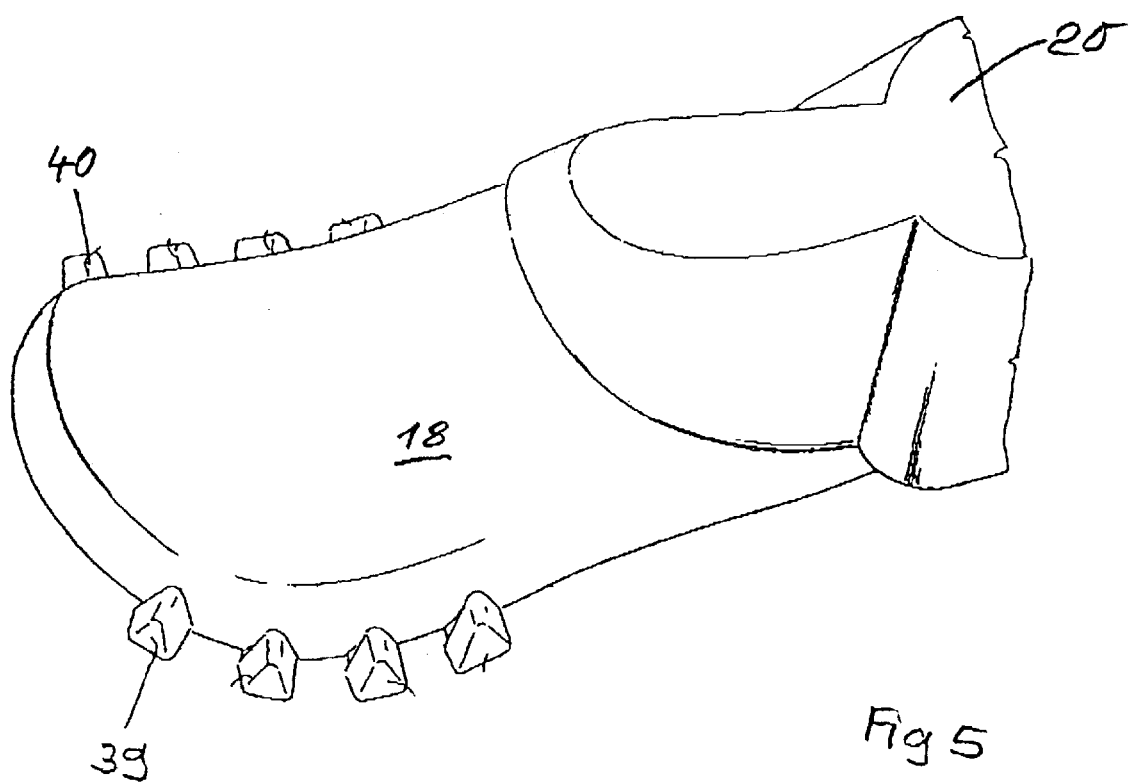
FIG. 5 a perspective view of a front region of a second embodiment of a core of the mould in accordance with the invention.

It is apparent from FIG. 5, that in the second preferred embodiment the core 18 has lateral cams 39, 40 which correspond to the location of the through-holes 5, 6, 7, 8.

Figure 6:
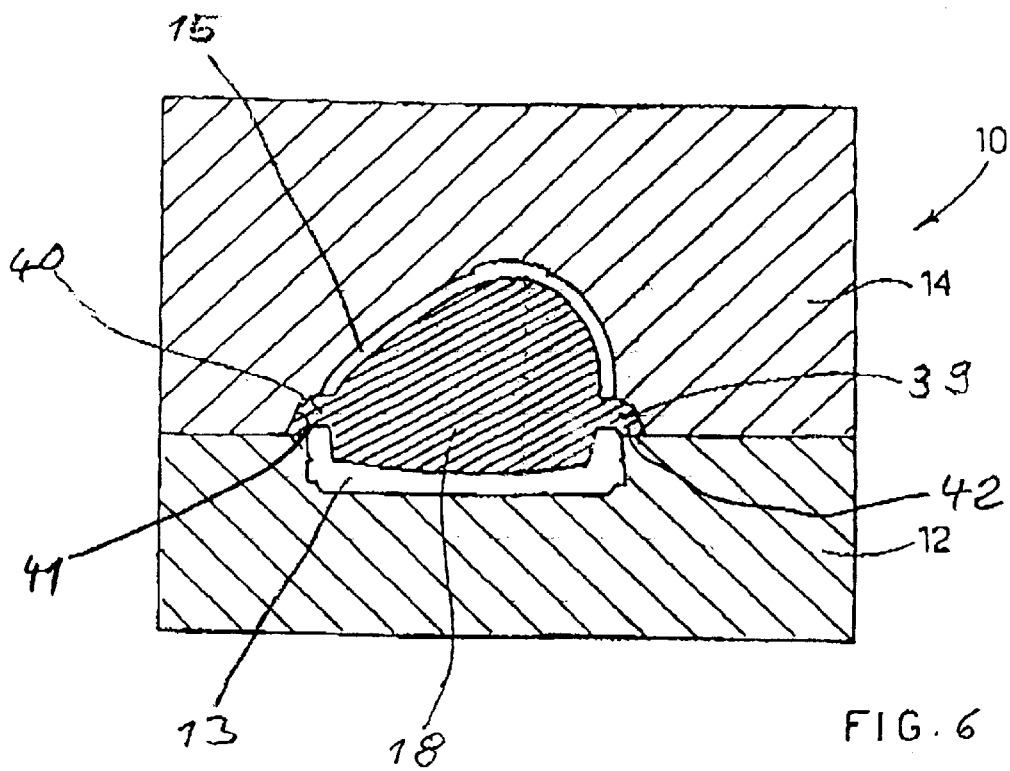
FIG. 6 a cross-section through another embodiment of a mould in accordance with the invention.

FIG. 6 illustrates the lower mould part 12 and the upper mould part 14 of the mould 10. They are in this embodiment so constructed that the cams 39, 40 can be wedged between the upper mould part 14 and the lower mould part 12 in cut-outs 41, 42.

Figure 7:
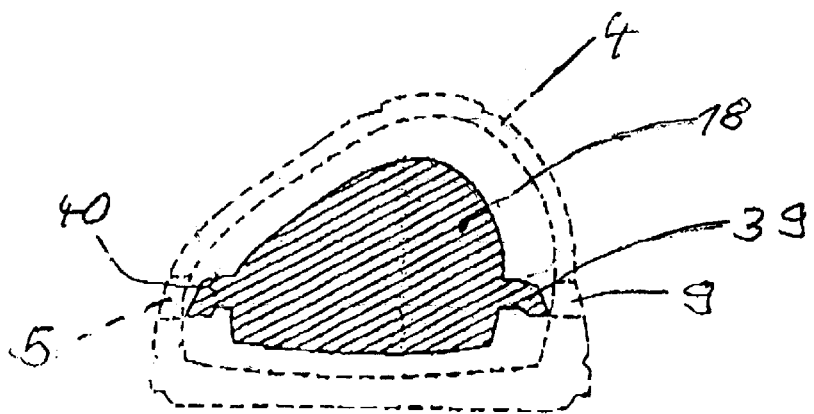
FIG. 7 a cross-section of the core with an already expanded shoe thereon.

FIG. 7 illustrates the shoe 4 in broken lines on the core 18 after expansion of the shoe 4. It is apparent that the shoe by way of the expansion has become larger than the core 18 to such a degree that the cams 39, 40 no longer engage the through-holes 5, 9 so that the shoe can be easily removed from the core 18.

What is claimed as new and desired to be protected By Letters Patent Is set forth in the appended claims:

What is claimed is:

1. Mould for moulding hollow products or products with recesses and made from a material which quickly expands after removal from the mould, comprising a pair of mould parts and a one-piece core surrounded thereby, wherein the mould parts and the core define a mould cavity provided with filling channels for injection of the moulding material, the core having an extension for engaging both mould parts, the extension being movably mounted on a guide column for movement out of the respective mould part when the mould is opened, and a compression spring being positioned in one of the mould parts and supported on the other mould part and the core.

2. Mould for moulding hollow products or products with recesses and made from a material which quickly expands after removal from the mould, comprising a pair of mould parts and a one-piece core surrounded thereby, whereby the mould parts and the core define a mould cavity provided with filling channels for injection of the moulding material, the core having an extension for engaging both mould parts, the extension being movably mounted on a guide column for movement out of the respective mould part when the mould is opened, and a compression spring being positioned in one of the mould parts and supported on the other mould part and the core, wherein the guide column is rigidly connected with one of the mould parts and extends through a through-passage in the extension and into a bore in the other mould part and the compression spring is positioned coaxially to the guide column.

3. Mould according to claim 2, wherein an end standing stop is provided at a free end of the guide column which limits the maximum possible stroke of the core on the guide column and together with the guide column extends into the bore in the mould part opposite the free end of the guide column.

4. Mould according to claim 3, wherein the mould parts respectively include two guide columns extending through the extension with respectively one associated compression spring.

5. Mould for moulding hollow products or products with recesses and made from a material which quickly expands after removal from the mould, comprising a pair of mould parts and a one-piece core surrounded thereby, whereby the mould parts and the core define a mould cavity provided with filling channels for injection of the moulding material, the core having an extension for engaging both mould parts, the extension being movably mounted on a guide column for movement out of the respective mould part when the mould is opened, and a compression spring being positioned in one of the mould parts and supported on the other mould part and the core, wherein the core has protruding cams which bridge the mould cavity in between the two mould parts and the core.

6. Mould according to claim 5, wherein the maximum radial extent of the cams is no larger than an inner dimension of the expanding product.

7. Mould according to claim 5, wherein the cams are constructed to be wedged in the closed mould within lateral cutouts.

8. A mould comprising a first mould part;

a second mould part;

a one-piece core surrounded by the first mould part and by the second mould part, wherein the first mould part, the second mould part and the core define a mould cavity provided with filling channels for injection of the moulding material;

an extension furnished at the one-piece core for engaging the first mould part and the second mould part;

a guide column disposed between the first mould part and the second mould part, wherein the extension is movably mounted on the guide column for movement out of a respective one of the first mould part and the second mold part when the mould is opened; and a compression spring being positioned in the first mould part and supported on the second mould part and on the core, wherein the mould is adapted to moulding hollow products or products with recesses and made from a material which quickly expands after removal from the mould.

9. The mould according to claim 8, wherein the guide column is rigidly connected to the first mould part and extends through a through-passage in the extension and into a bore in the second mould part and wherein the compression spring is positioned coaxially to the guide column.

10. The mould according to claim 9 further comprising an end standing stop furnished at a free end of the guide column, wherein the end standing stop limits a maximum possible stroke of the core on the guide column and together with the guide column extends into the bore in the second mould part opposite the free end of the guide column.

11. The mould according to claim 10 further comprising a second guide column disposed between the first mould part and the second mould part, whereby the guide columns are disposed between the first mold part and the second mold part and wherein the guide columns extend through the extension.

12. The mould according to claim 11, wherein the compression spring is associated with the extension.

13. The mould according to claim 8 further comprising a protruding cam furnished at the core and bridging the mould cavity in between the first mold part and the second mould part on the one hand and the core on the other hand.

14. The mould according to claim 13, wherein a maximum radial extent of the protruding cam is not larger than an inner dimension measured relative to an outer periphery of the product being molded.

15. The mould according to claim 13, wherein the protruding cam is constructed to be wedged in the closed mould through lateral cutouts.

16. Mould for moulding hollow products or products with recesses and made from a material which quickly expands after removal from the mould, comprising a first mould part, a second mold part, and a one-piece core surrounded thereby, whereby the first mould part, the second mold part, and the core define a mould cavity provided with filling channels for injection of the moulding material, the core having an extension for engaging both the first mould part and the second mold part, the extension being movably mounted on a guide column for movement out of a respective one of the first mould part and of the second mold part when the mould is opened, and a compression spring being positioned in the first mould part and supported on the second mould part and the core.

17. Mould for moulding hollow products or products with recesses and made from a material which quickly expands after removal from the mould, comprising a pair of mould parts and a one-piece core surrounded thereby, whereby the mould parts and the core define a mould cavity provided with filling channels for injection of the moulding material, the core having an extension for engaging both mould parts, the extension being movably mounted on a guide column for movement out of the respective mould part when the mould is opened, and a compression spring being positioned coaxially to the guide column in one of the mould parts and supported on the core.

* * * * *